Aug. 26, 1958          H. A. WARNER          2,848,939
APPARATUS FOR EXTRACTING JUICE FROM WHOLE CITRUS FRUITS
Filed March 12, 1956          8 Sheets-Sheet 1

FIG. 1

*INVENTOR.*
HARRY A. WARNER
BY
ATTORNEY

INVENTOR.
HARRY A. WARNER

FIG. 5

Aug. 26, 1958 H. A. WARNER 2,848,939
APPARATUS FOR EXTRACTING JUICE FROM WHOLE CITRUS FRUITS
Filed March 12, 1956 8 Sheets-Sheet 6

*INVENTOR.*
HARRY A. WARNER
BY

ATTORNEY

Aug. 26, 1958 H. A. WARNER 2,848,939
APPARATUS FOR EXTRACTING JUICE FROM WHOLE CITRUS FRUITS
Filed March 12, 1956 8 Sheets-Sheet 8

INVENTOR.
HARRY A. WARNER
BY
ATTORNEY 2,848,939
APPARATUS FOR EXTRACTING JUICE FROM
WHOLE CITRUS FRUITS
Harry A. Warner, Miami, Fla.
Application March 12, 1956, Serial No. 570,774
6 Claims. (Cl. 100—108)

The present invention relates to apparatus for extracting juice from citrus fruit, and the like.

An important object of the invention is to provide an apparatus for extracting the juice from citrus fruit, such as oranges, without abrading or cutting the outside peel or rind, except for one small opening, through which the juice is extracted, and thereby preventing the pungent oils and other substances of the rind from being blended or mixed with the pure juice.

Another object is to provide means for extracting the juice from citrus fruit without the necessity for cutting the fruit in half, as is usually done.

Another object of the invention is to provide an apparatus of the above-mentioned character, the use and practice of which will result in the efficient extraction of substantially all of the pure juice of the fruit, while leaving the pulp and seeds within the rind or skin for disposal with the enclosing rind.

Another object is to provide means for straining the juice during its extraction from the fruit and before it leaves the fruit, thus making it unnecessary to subsequently employ a straining operation after the juice has been removed.

A still further object is to provide an apparatus embodying a novel and simplified combination of elements for extracting the juice from citrus fruit in a highly efficient and sanitary manner.

Other objects and advantages of the invention will be apparent during the course of the following description, reference being had to the accompanying drawings wherein has been illustrated a preferred form of the device and wherein like characters of reference are employed to denote like parts throughout the several figures.

In the drawings, where for the purpose of illustration is shown a preferred embodiment of the invention, the numeral 20 designates generally an upright housing or body portion for the main working elements of the apparatus, and the housing 20 is preferably provided at its bottom with a horizontal base plate 21, which may be attached to or mounted upon a table or other suitable support.

Formed integral with the upper portion of the housing 20 and projecting dependingly therein is a lower hemispherical mold section 22, having its top open, as shown. This lower mold section 22 is adapted to contain an elastic inflatable jacket section, indicated generally by the numeral 23 and shown in the uninflated or free position in Figure 5, and in the inflated or expanded condition in Figure 4. The jacket section 23, Figure 5, comprises an upper circular wall 24 and a lower annular generally spherically curved wall 25, integrally connected with the wall 24, near the margin of the latter, and assuming the position shown in Figure 5, while in the uninflated or relaxed condition. The jacket section 23 further comprises a central annular or tubular portion 26, integrally connected with the walls 24 and 25, as shown, and forming therewith an air tight annular chamber 27. The jacket section 23 is provided at its marginal edge with an annular flange or enlargement 28, seated within an annular groove 29, formed in the top of housing 20, as shown.

Figure 5:
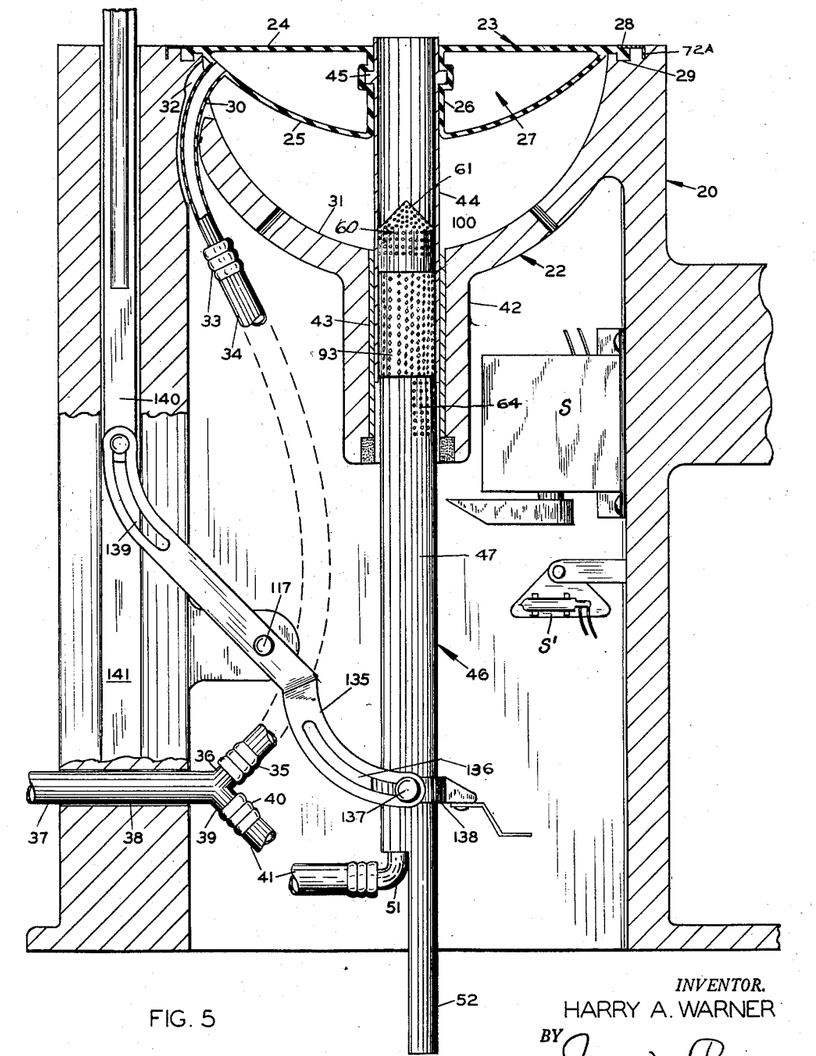
Figure 5 is an enlarged vertical section with the parts in a position prior to the extracting operation.

A flexible tube or conduit 30 is joined with the wall 25, in an air-tight manner near and inwardly of the margin of jacket section 23 and inwardly of the inner face 31 of lower mold section 22, Figure 5. The tube 30 projects through a suitable opening 32 formed in the wall of mold section to the interior of housing 20 for connection at 33 with a compressed air hose 34, which extends further downwardly within the housing 20 for connection at 35 with one branch 36 of a compressed air pipe 37. The pipe 37 extends through an opening 38 in the housing 20 near its lower end and outside of the housing for connection with a suitable air compressor and relief valve means, not shown. The pipe 37 has a second branch 39 within the housing, connected at 40 with a second hose 41, which serves a purpose to be described.

The lower mold section 22 has an integral depending tubular extension 42 formed integral therewith, and receiving a tubular sleeve or liner 43, suitably rigidly secured within the bore of extension 42, with its top end flush with the spherical face 31. A tube 44 is mounted to reciprocate vertically within the bore of the liner 43, Figures 5 and 4, and this tube has its upper and lower ends open, and is provided near and below its upper end with an annular radial flange 45, over which the elastic annular wall 26 is stretched for positioning the jacket section 23 in substantially fixed relation with the tube 44 for movement therewith, upon reciprocation of the latter.

The numeral 46 designates generally a juice extracting and bladder inflating device or unit, comprising a body portion or tube 47, of a diameter to reciprocate vertically within the bore of the tube 44, and preferably having a close sliding fit therein. The tube 47 is divided internally by a wall or partition 48, suitably rigidly secured therein and extending throughout its entire length, and forming therein separate non-communicating compressed air and juice extracting passages 49 and 50. At its lower end, the tube 47 has its compressed air passage 49 connected in an air tight manner by means of elbow 51 with the second air hose 41. An integral depending tubular extension 52 on the tube 47 forms a continuation of the juice passage 50, and the extension 52 may extend through the bottom opening of the housing 20, Figure 5, for connection with a hose or tube 53, so that the extracted juice may be conveyed to a suitable collection vessel or jar.

The tube 47 is provided at its upper end with an inwardly directed annular wall or shoulder 54, and a reduced tubular extension 55 is integrally connected with the wall 54 and extends above the same and has its bore communicating with both passages 49 and 50. The partition 48 extends upwardly into the bore of extension 55 and is integrally joined with the side wall of the extension 55 near and below its upper end, as at 56. The arrangement forms within the reduced extension 55 air and juice passages 57 and 58 which lead to and communicate with the passages 49 and 50, and in effect form continuations of the latter. The passages 57 and 58 do not communicate with each other. An air opening 59 is formed through the wall of extension 55 near its longitudinal center and this opening communicates with the passage 57.

The upper end of extension 55 has detachably secured to it a hollow juice extracting head or tip 60, including an upwardly directed conically tapered point 61 for penetrating the fruit. The side wall 62 and conically tapered portion 61 are perforated over substantially their entire areas, as at 63, so that the fruit juice may be forced through the perforations 63 and thereby strain, when it enters the interior of the head 60 and subsequently flows downwardly through the passages 58 and 50 to the outlet tube 53. Additional perforations 64 are formed through the tube 47, just below the shoulder 54 and only through the portion of the tube 47 having the passage 50. There are no perforations 64 in the tube 47 upon the opposite side of partition 48 or leading to the air passage 49. The perforations 64 also serve to strain the juice forced into the passage 50 from a lower section of the fruit, as will be further described.

The unit 46 is mounted for vertical reciprocation within the tube 44, which tube may also reciprocate within the liner 43 and relative to the unit 46. Inflation and deflation of the jacket section 23 causes the tube 44 to reciprocate vertically between its positions shown in Figures 4 and 5, whereas reciprocation of the unit 46 within the tube 44 is accomplished by the action of a mechanical linkage, to be described.

Figure 4:
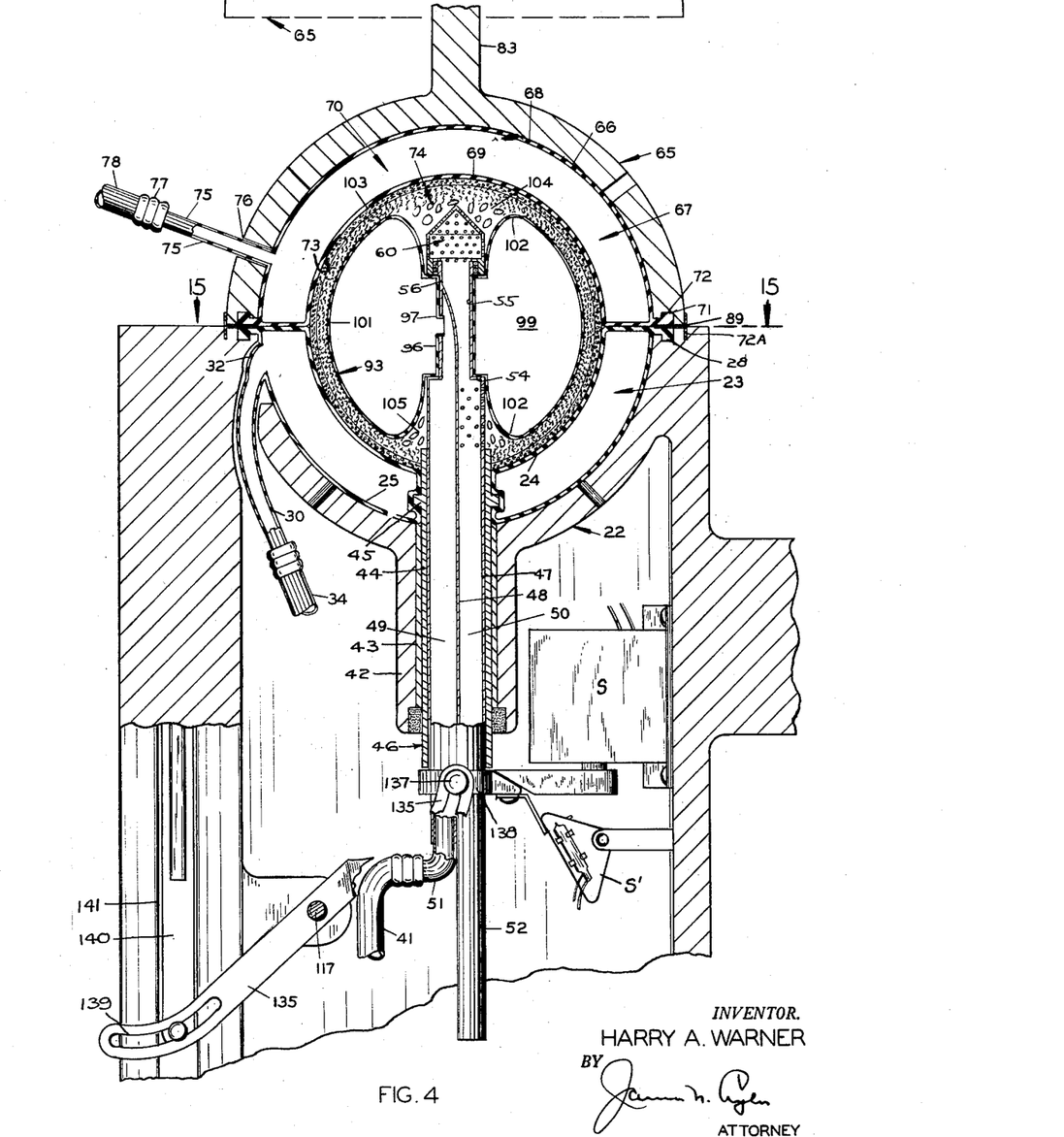
Figure 4 is an enlarged fragmentary vertical section showing the mechanism in the fully engaged extracting position.

A companion hemispherical mold section or head 65 is provided for coaction with the lower mold section 22 and associated elements. This upper mold section 65 has a hemispherical cavity 66 which contains an inflatable jacket section 67, similar to the inflatable jacket section 23. The jacket section 67 embodies upper and lower elastic walls 68 and 69, forming between them an airtight chamber 70 similar to the chamber 27. The walls 68 and 69 are integrally joined near their margins, as shown, and the jacket section 67 has an annular marginal flange 71, integral therewith, for engagement within an annular groove 72, formed in the bottom face of mold section 65, directly above and opposite the groove 29. The jacket section 67 differs from jacket section 23, mainly in that it does not have the central tubular wall 26 for receiving the tube 44, Figure 4. The chamber 70 is therefore hemispherical in shape when jacket section 67 is inflated, Figure 4. Jacket section 67 assumes the shape shown in Figure 1 when it is deflated, corresponding to the condition of jacket section 23 in Figure 5. As best shown in Figure 4, when the mold sections 22 and 65 are positioned together in opposed contacting relation, and the jacket sections 23 and 67 are fully inflated, the inner walls 24 and 69 of the jacket sections form a spherical chamber 73 to receive the orange or citrus fruit 74, as will be more fully explained. As shown in Figure 4, the outer jacket walls 25 and 68 then constitute a substantially continuous spherical wall, contacting and covering the spherical cavity afforded by the inner faces of mold sections 22 and 65.

The outer wall 68 of jacket section 67 has secured to it in an air tight manner, near and above the bottom of mold section 65, a radial air inlet tube 75, which projects through a radial opening 76 formed in the wall of mold section 65 above and at the same side of the apparatus as the opening 32. The tube 75 is suitable connected at 77 with a flexible hose or conduit 78, leading to and connected with a source of compressed air and a relief valve means, not shown. The jacket sections 23 and 67 and the tubes 30 and 75 are formed of rubber or rubber-like material, and the various air hoses 34, 41 and 78 are also formed of flexible material, such as rubber.

Means are provided to support and to guide the upper mold section 65 so that it may reciprocate vertically toward and from the lower mold section 22. Such means comprises an upstanding generally U-shaped rigid yoke 79, bolted or otherwise rigidly secured at 80 to the top of housing 20, adjacent one side of the upper mold section 65. The yoke 79 has an upper generally horizontal bight portion 81 spaced above the upper mold section 65, as shown. This bight portion 81 has a vertical bore means 82 formed therethrough, in alignment with the vertical axis through the centers of the mold sections 22 and 65, and associated elements. A vertical piston rod 83 has its lower end rigidly secured to the top of mold section 65, and the piston rod extends through and reciprocates within the bore means 82, which bore means may include a suitable seal 84 having fluid-tight engagement with the piston rod 83. Above the yoke 79, the piston rod 83 carries a piston 85, adapted to reciprocate vertically within an air cylinder 86, extending above and rigidly secured to the top of yoke 79. The upper end of the cylinder 86 is connected with a compressed air line or pipe 87, in turn leading to and connected with a source of compressed air, not shown. The piston 85, rod 83 and mold section 65 are normally urged upwardly by a compressible coil spring 88, which surrounds the rod 83, within the cylinder 86, and between the top of the yoke 79 and the piston 85. When compressed air is supplied to the top of the cylinder 86, the piston 85 compresses spring 88 and shifts the upper mold section 65 downwardly into opposed contacting relation with the lower mold section 22, Figure 4. Suitable detachable gaskets 89 and 72a, Figure 4, are disposed between the meeting faces of the mold sections 22 and 65, and these gaskets overlie between the flanges 28 and 71 of the inflatable jacket sections, as shown, and serve to retain the mold sections 23 and 67 against accidental displacement. The detachable gaskets thus permit the ready removal of the mold sections for cleaning or replacement. The upper casing section 65 has a pair of lugs 90 integrally formed thereon, at opposite sides of the same, for guiding engagement in vertical grooves 91, formed in corresponding sides of the vertical legs 92 of yoke 79. By this means, the upper mold section 65 is guided and positively stabilized during its movement toward and from the lower mold section. When the air pressure in the cylinder 86 is relieved, the spring 88 automatically elevates the upper mold section 65 to a position well above the housing 20, Figure 1, so that the orange which has had the juice extracted therefrom may be ejected from the apparatus and a new orange arranged in place upon the housing 20, by means to be described.

With particular reference to Figures 4 and 16 to 18, there is provided an elastic inflatable bladder device 93, formed of rubber or rubber-like material. This bladder device comprises, in the collapsed or deflated condition, Figure 5, an outer substantially cylindrical wall 94, which increases slightly in thickness from the longitudinal center of the bladder device 93 toward its opposite end walls 95. The end walls 95 are annular, and are integrally joined at their inner margins with a relatively thin annular or tubular wall 96, arranged concentrically inwardly of the outer wall 94 and extending throughout the length of the bladder device. The opposite ends of the bore of the inner wall 96 are open, Figure 18. At its longitudinal center, the tubular wall 96 has a radially inwardly projecting nipple 97 formed integrally thereon, as shown. This tubular nipple communicates with the bore 98 of the inner wall 96 and with the annular space or chamber 99 formed by the walls 94, 95 and 96.

The bladder device 93 in the collapsed or deflated position is mounted upon the reduced tubular portion 55 of the unit 46 after removal of the head 60. The inner wall 96 snugly engages the tubular portion 55, and the nipple 97 engages within the opening 59 and communicates with the air passage 57, whereby this air passage is placed in direct communication with the interior chamber 99 of the bladder device 93.

When the bladder device 93 is collapsed or deflated, its outer periphery is substantially flush with the outside diameter of the tip of head 60 and the tube 47, and the end walls 95 of the bladder device are positioned against the shoulder 54 and the lower end or shoulder 100 of the tip 60. This permits the bladder device 93, along with the tip 60 and tube 47, to pass through the bore of the intermediate tube 44.

When the apparatus is arranged as in Figure 4 for extracting juice from the orange 74, and the tip 60 has been thrust upwardly into the orange, as will be more fully described, the portion of the unit 46 carrying the bladder device 93 is arranged wholly inside of the orange 74. When air pressure is now supplied through the hose 41 to the air passage 49, such compressed air will pass through the passage 57 and nipple 97 to the chamber 99 of the bladder device 93. The outer wall 94 of the bladder device will now be expanded or inflated to assume the shape in Figure 4, wherein the interior chamber 99 will be greatly enlarged and will form in effect a generally spherically curved annular space or chamber inside of the orange 74. Due to the fact that the wall 94 is thinner near its longitudinal center than at its ends, Figure 18, this wall will expand or stretch more readily near the vertical center of the orange, as at 101 than at the points near the top and bottom of the orange, as at 102, where the wall 94 is thicker. Accordingly, the inflated bladder device 93, Figure 4, will assume the particular shape shown therein and substantially the entire interior of the orange will be filled by the bladder device, and the pulp and seeds, as well as the juice, will be forced outwardly toward the rind 103.

When this occurs, the jacket sections 23 and 67 will have been inflated with air under pressure, and will have assumed their shapes shown in Figure 4, wherein they will exert a strong holding or confining action on the exterior cylindrical surface of the orange 74, so that the orange cannot expand or burst. By virtue of this, all of the juice in the orange will be forced into the regions at 104 and 105 near the top and bottom of the orange and surrounding the tip 60 and the portion of the tube 47 having the perforations 64. The juice will be forced to flow inwardly through the perforations 63 and 64 and into the juice passage 58 and the juice passage 50. From here, the juice will pass downwardly through the extension 52 and hose 53 to the collection point or receptacle. The orange 74 will be completely juiced or freed of juice by the abovedescribed action of the bladder device 93, and associated elements.

The outer wall 94 of the bladder device is preferably provided over its entire area with a multitude of small pointed projections 106, for the purpose of abrading or penetrating the multitude of small juice cells contained in the orange, and thereby more readily expelling the juice and forcing it to flow through the perforations 63 and 64 to the juice outlet passages. It should be mentioned here that the projections 106 may be omitted if desired, and the bladder device 93 will function satisfactorily without them.

Any suitable vibrating means may be employed as is well recognized in the art, and not shown, that would cause the projections 106 to more effectively rupture the juice cells of the orange. It should also be mentioned that the perforations 63 and 64 serve to effectively filter or strain the juice as it flows therethrough into the passages 58 and 50, so that no subsequent and separate straining operation need be performed upon the juice, as the same will be entirely free of pulp and other solid matter as it flows through the extension 52 to the collection receptacle.

Additionally, the above described juice extracting operation does not cause any abrading or cutting of the rind 103 of the orange, and the pungent oils and extracts in the rind are not caused by the process to mix with or enter the pure juice and damage the flavor of the same. When the orange has been juiced by the process, all of the pulp, seeds and waste matter will be contained within the unruptured portion of rind, so that when the juiced orange is ejected from the apparatus, the waste matter contained in the rind will likewise be conveniently ejected in a highly sanitary manner.

Means are provided to form a hole or aperture in each individual orange, prior to juicing the same, and to convey each orange at the proper time to its position between the mold sections 22 and 65, and to simultaneously eject the previously juiced orange from the apparatus. Such means comprises a vertically disposed and upwardly directed rotary boring device or cutter 107, arranged in spaced relation to the housing 20 at its side remote from the yoke 92, Figure 3. The cutter 107 is carried on a vertical rotating spindle 108, having means 109 and 110 to elevate and lower the spindle while it is rotating. The spindle 108 is driven from the armature shaft 111 of a suitable motor 112, or the like, mounted upon the base plate 21, as shown. A suitable bearing or holder 113 for the means 109 and 110 and the spindle is provided, and this bearing is fixedly secured to the housing 20 by a horizontal arm 114, or the like, rigidly secured thereto.

A pair of gear sectors 115 are pivoted at 116 to opposite sides of the housing 20, upon a horizontal rock shaft 117 which extends through the housing 20, below the mold section 22. The sectors 115 are adapted to oscillate about the axis of the rock shaft 117, and they mesh with pinions 118, which are journaled at 119 to opposite sides of the housing 20, near its upper end and above the gear sectors. The pinions 118 mesh with and drive rack bars 120, which operate or reciprocate within a pair of horizontal sleeves 121, rigidly secured to the opposite sides of the housing 20 near its upper end. The sleeves 121 are notched at 122, to permit engagement of the pinions 118 with the rack bars, Figure 3.

Figure 7:
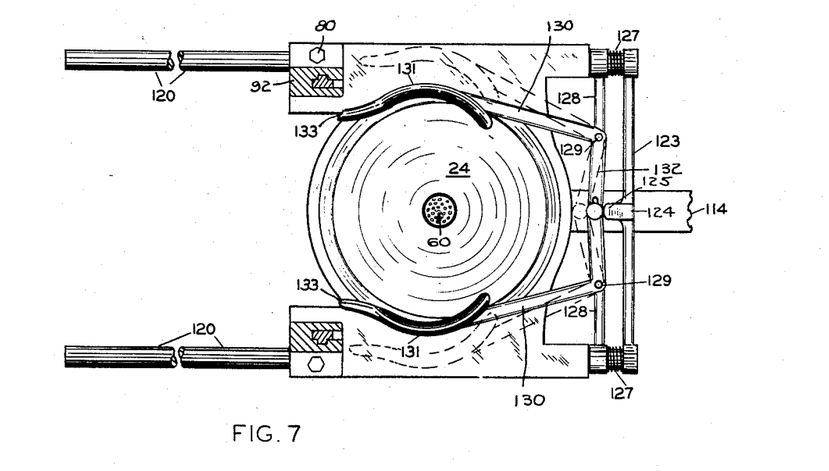
Figure 7 is a horizontal section taken substantially on line 7—7 of Figure 1, parts being omitted for the sake of clearness.
Figures 8, 10:
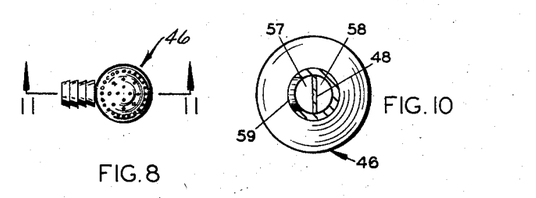
Figure 8 is a top plan view of a combined air conducting and juice drain tube.
Figure 10 is an enlarged horizontal section taken on line 10—10 of Figure 9.
Figure 9:
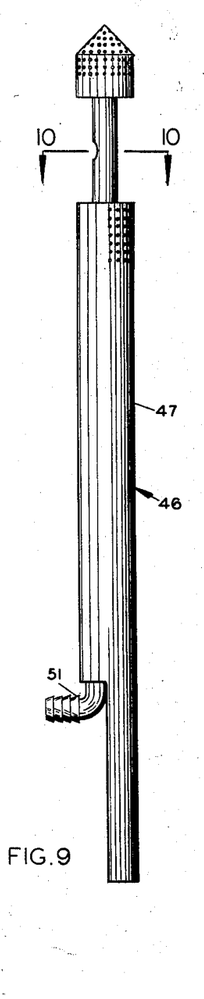
Figure 9 is a side elevation of the tube shown in Figure 8.
Figure 11:
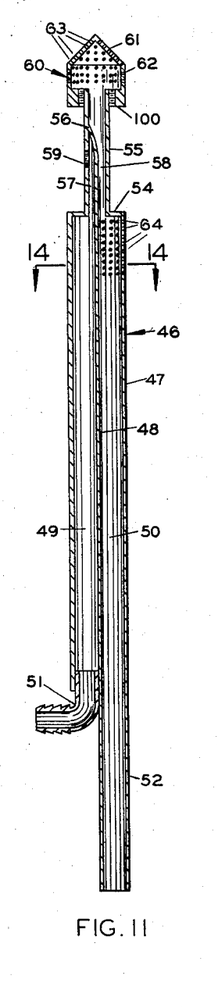
Figure 11 is a vertical section taken substantially on line 11—11 of Figure 8.
Figure 12:
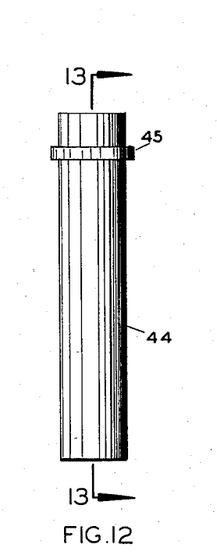
Figure 12 is a side elevation of a pilot tube embodied in the device.
Figure 13:
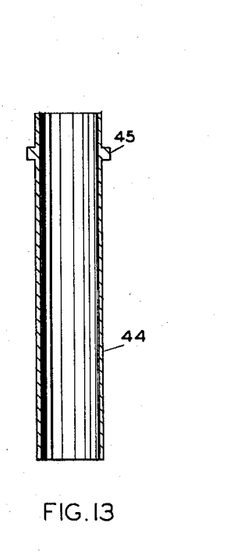
Figure 13 is a vertical section taken on line 13—13 of Figure 12.
Figure 14:
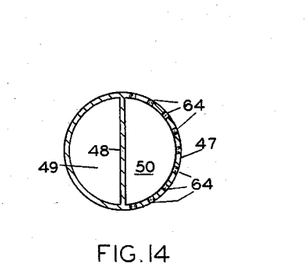
Figure 14 is a horizontal section taken on line 14—14 of Figure 11.

The rack bars 120 constitute the opposite sides of a horizontal reciprocatory frame or conveyor device for the oranges 74, which are to be individually conveyed into position between the two mold sections. Corresponding ends of the rack bars 120 have a cross bar 123 extending therebetween, and rigidly secured thereto. At its longitudinal center, this cross bar has an upstanding arm 124, provided at its top with a head 125. Inwardly of the cross bar 123, a pair of cross heads 126 are slidably mounted upon the rack bars 120 and are urged inwardly by compressible coil springs 127, these springs being positioned between the cross heads 126 and the ends of the fixed cross bar 123. The cross heads 126 carry inwardly projecting arms 128, having upstanding extensions 129 secured to their inner ends, and a pair of gripping bell cranks 130, including orange gripping portions 131 and transverse operating extensions 132 are pivoted to the tops of the extensions 129, as shown. The arrangement is such that when the rack bars 120 are in their outermost positions, remote from the housing 20, that the arms 131 are maintained by the springs 127 in gripping engagement with each orange 74 to hold the same stationary while it is being bored through its bottom by means of the rotary cutter 107 and the reciprocating means 109 and 110 for the cutter. Subsequently, when the rack bars 120 are shifted inwardly or toward the housing 20, for positioning the orange 74 which has been bored directly over the upper end of the tube 44, the cross heads 126 will engage the adjacent ends of sleeves 121 and the springs 127 will compress for allowing the cross heads to shift toward the bar 123, Figure 7. When this occurs, the projection 125 will engage the operating arms 132 of the gripping bell cranks 130, and the orange gripping portions 131 of the bell cranks will separate, Figure 7, and release the orange and deposit it squarely on top of the tube 44, the upper mold section 65 of course being elevated at this time. It should be mentioned that the forward extremities 133 of the gripping bell cranks will engage and eject the shell or rind of the orange which has been previously juiced, forcing it off of the now deflated jacket section 23 and the top of tube 44, prior to positioning the next orange to be juiced thereon.

Suitable hopper means 134 is arranged above the cutter 107 and the orange gripping and conveying mechanism, to operate in properly timed sequence with the conveying mechanism, in order to deposit the oranges individually and successively between the gripping elements 131. This hopper means may be of any well-known or conventional type. It should also be mentioned here that the gripping and conveying means for the oranges may be of any preferred or conventional type, and need not be the particular means shown and described, and it is intended not to limit the invention to any particular means for supplying or conveying the oranges to their position between the mold sections 22 and 65, where they are juiced.

Means are provided to properly operate or reciprocate the unit 46 in properly timed sequence with the operation of the gripping and conveying means 120—130 and the vertically movable mold section 65 and associated parts. Such means comprises a diagonal link 135, rigidly secured to the rock shaft 117, within the housing 20, and extending upon opposite sides of the rock shaft, as shown. One end of the link 135 is slotted at 136 to form a pivotal sliding connection at 137 with a collar 138 rigidly secured to the unit 46, near and above the elbow 51. The opposite end of the link 35 has a curved slot 139 for forming a pivotal sliding connection with a vertical reciprocatory element 140, which operates within a vertical bore 141, formed in the wall of housing 20. The upper end of the element 140 is suitably connected with one side of the vertically shiftable mold section 65, to be raised and lowered thereby when the mold section is operated by the spring 88 and compressed air cylinder 86.

It may thus be seen that when the upper mold section 65 is raised and lowered, the vertical element 140 will be raised and lowered, and the link 135 will turn upon its pivot and raise or lower the unit 46. Simultaneously, the rock shaft 117 will be turned and the gear sectors 115 will oscillate to drive pinions 118 and the rack bars 120, which in turn cause the operation of the orange gripping means, previously described.

Any conventional mechanical or electrical timing devices S and S' may be employed for operating the hopper means 34 and the compressed air source or sources in properly timed sequence, and it is believed to be unnecessary to proper understanding of the juice extracting apparatus to show and describe any particular timer or control mechanism for the various component parts of the apparatus, as conventional timers of various types are readily available upon the market. Such a conventional timing and controlling device will not only control the operation of the compressed air source to the cylinder 86, but will also control the compressed air source to the hoses 34, 41 and 78 which supply compressed air to the jacket sections 23 and 67 and to the bladder device 93 for inflating the same. The timing and control means will also control suitable relief valve means at the source or sources of compressed air to allow for the properly timed deflation of the jacket sections and bladder device.

Figure 3:
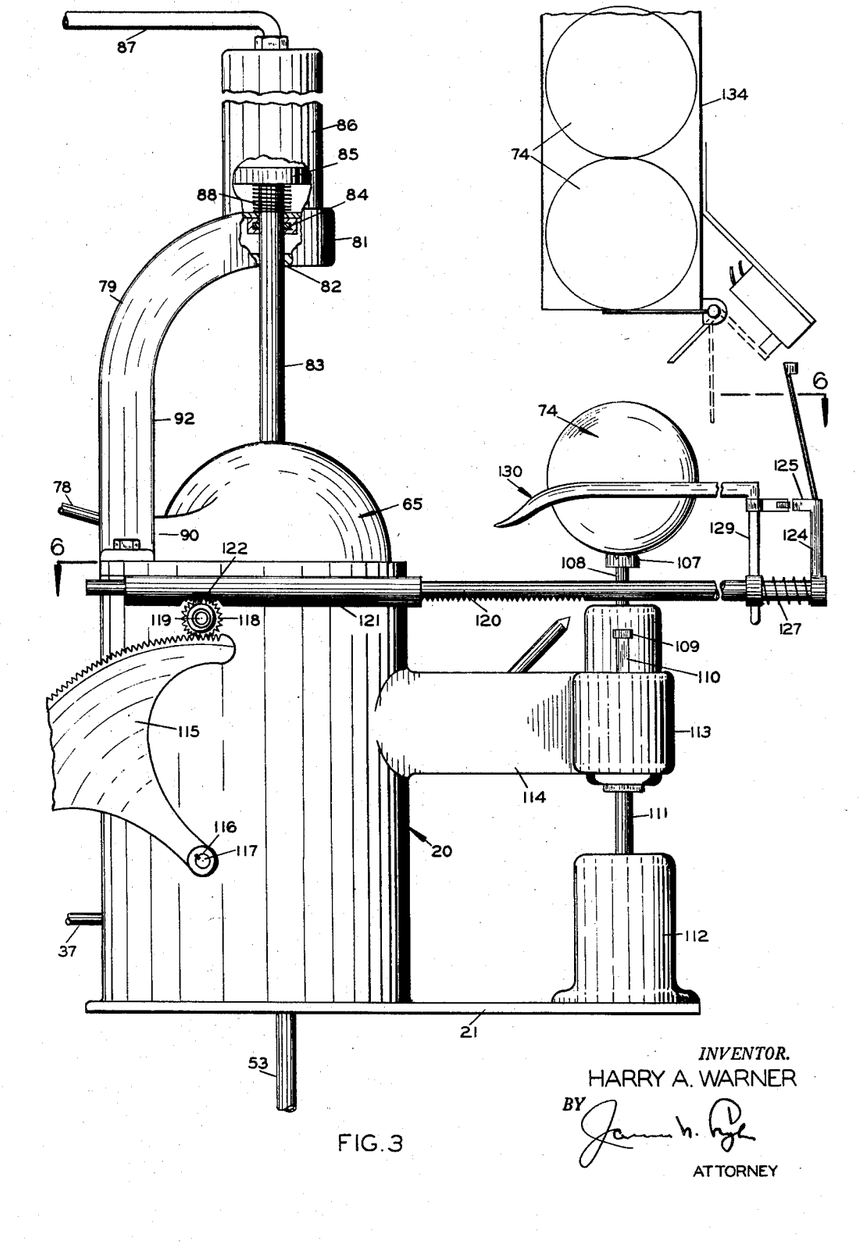
Figure 3 is a composite side elevation of the mechanism of Figure 1 but with the parts shifted to the extracting position.

The general operation of the apparatus in the practice of the method is as follows:

Compressed air is supplied at timed intervals to the cylinder 86 for forcing the piston 85 and upper mold section 65 downwardly to the position of Figure 3. The air pressure in the cylinder 86 is also relieved at intervals, and the spring 88 will then elevate the piston 85 and upper mold section 65 to their positions shown in Figure 1.

When the upper mold section 65 is elevated, the member 140 will be elevated for turning the link 135 clockwise in Figure 5, and this will lower the unit 46 to the position of Figure 5. The bladder device 93 is now relaxed or deflated, as are the jacket sections 23 and 67. When the link 135 is thus turned clockwise, Figure 5, the rock shaft 117 will turn the gear sectors 115 clockwise, Figure 1, and when this occurs, the orange gripping and conveying means including rack bars 120 and the gripping bell cranks 130 will be shifted to the left or to the position shown in Figure 1, so that the orange 74 will be arranged between the upper and lower mold sections 65 and 22, and directly above the upper end of tube 44. When the orange reaches this position, and the cross heads 126 engage the sleeves 121 for compressing the springs 127, as previously described, the gripping portions 131 of the bell cranks will be open or separated, Figure 5, and the orange will be placed squarely upon the top of tube 44.

Prior to this, the hopper means 134 will have operated in properly timed sequence for depositing the orange 74 upon the gripping and conveying bell cranks 130, Figure 3, and the elements 107 and 109 will have been operated to bore a single hole in the bottom of the orange, which hole will register with the top of tube 44 when the orange is subsequently deposited thereon. The only cutting or breaking of the rind 103 is done by the perforating cutter 107, and the small disc or section of rind severed by the cutter 107 is disposed of by any suitable means such as a jet of air through a bore of the cutter.

Figure 1:
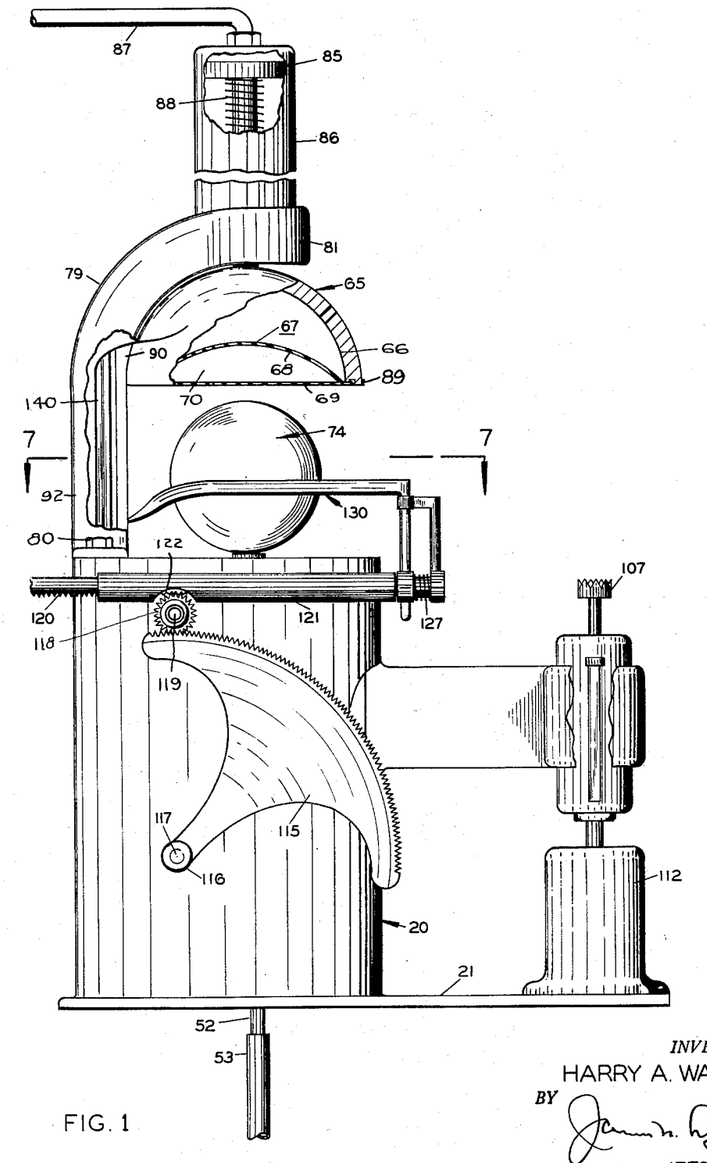
Figure 1 is a side elevation of a machine constructed in accordance with the invention and with the parts being in a position prior to extraction.
Figure 2:
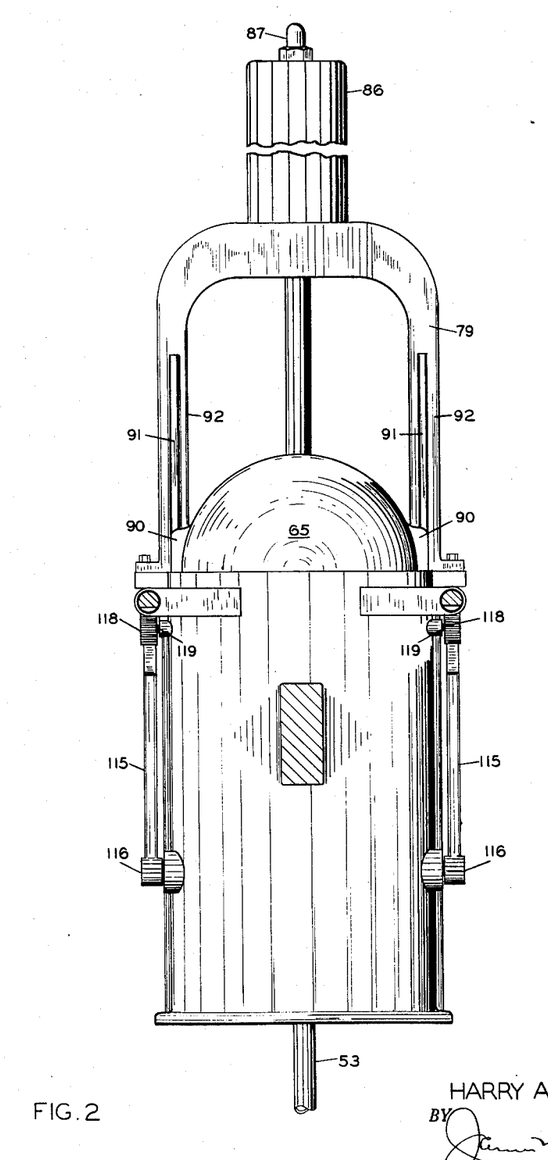
Figure 2 is a view at right angle to Figure 1, parts being shown in section for purpose of clearness and with the mechanism being shifted to the extracting position.

With the orange positioned as in Figure 1, between the upper and lower mold sections, compressed air is supplied to the cylinder 86 for lowering the upper mold section 65 to the position of Figure 3. Simultaneously with this, the member 140 is lowered, and the link 135 turns counter-clockwise to the position of Figure 4, for forcing the unit 46 upwardly through the pre-formed opening in the bottom of the orange, and the tip or head 60 will be disposed within the orange, near the top of the same, and the portion of tube 47 having the perforations 64 will be arranged inside of the orange near its bottom, Figure 4. At this time, the bladder device 93 is still uninflated, as are the jacket sections 23 and 67.

When the upper mold section 65 is shifted downwardly, as above-described, and the unit 46 travels upwardly, the force exerted by the uninflated jacket section 67 on the orange and transmitted through the orange to the lower jacket section 23 will shift the tube 44 downwardly within the liner 43 to the position shown in Figure 4.

When all of this has been done, substantially instantaneously, the jacket sections 23 and 67 are inflated with compressed air from the tubes 30 and 75, and associated elements, and this will occur in properly timed sequence. The inflated jacket sections will then exert a strong compressive and holding action upon the exterior of the orange so that it cannot expand or burst.

Substantially simultaneously with the inflation of the jacket sections 23 and 67, or momentarily thereafter, the bladder device 93 is inflated by means of the hose 41, air passages 49 and 57, and associated elements, and the bladder device will expand outwardly and assume the position shown in Figure 4 for forcing all of the juice out of the orange and straining the juice by means of the perforations 63 and 64, as has previously been described. The juice will then flow through the passages 58 and 50 and through the tube 53 to the desired collection receptacle.

Figures 15, 16, 17, 18, 19:
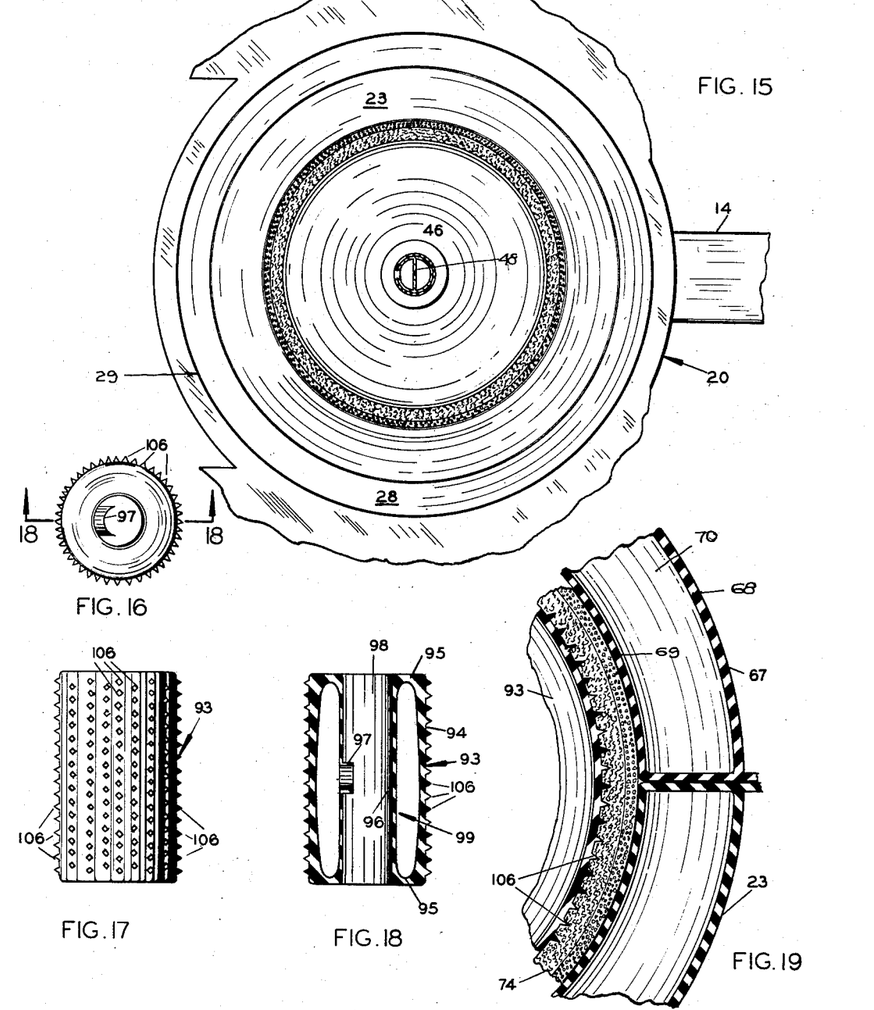
Figure 15 is a section taken substantially on line 15—15 of Figure 4, parts being omitted.
Figure 16 is a top plan view of an inflatable extracting device.
Figure 17 is a side elevation of the device of Figure 16.
Figure 18 is a section taken on line 18—18 of Figure 16.
Figure 19 is a greatly enlarged fragmentary section taken through the several inflatable units and in the operative extracting position.

When the juicing operation is thus completed, the air pressure to the bladder device 93 and to the jacket sections 23 and 67 is relieved, and these elements are deflated, and the bladder device, due to its elasticity, will return immediately to its collapsed position, Figures 5 and 18. The air pressure in the cylinder 86 is now relieved, and the spring 88 will elevate the upper mold section 65, and associated elements. At this occurs, the member 140, link 135, rock shaft 117, gear sectors 115 and associated elements will again operate to shift the orange gripping and conveying means to their position of Figure 7, where the previously juiced orange 74 will be ejected by the extensions 133 and the next orange having the hole bored in its bottom will be arranged between the upper and lower mold sections, Figure 1. The cycle of operation will then be repeated, as above described, for extracting the juice from the next orange, and so on.

Figure 6:
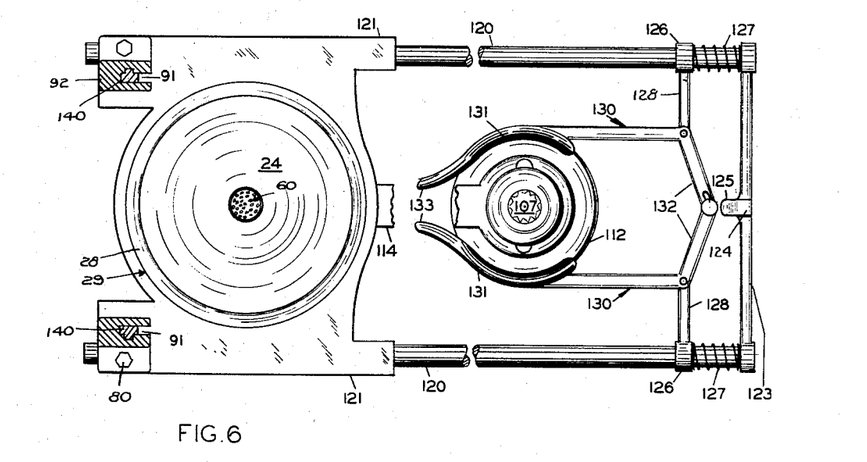
Figure 6 is a horizontal section taken substantially on line 6—6 of Figure 3.

It should be mentioned that when the upper mold section 65 descends to its position in Figure 3, that the orange gripping and conveying means including rack bars 120 will return automatically to their outermost position shown in Figure 6.

It should be clearly understood, that during the compressing and extracting operations, that the pressures both externally and internally must be equalized. Further, it is pointed out that the juice being extracted is wholly uncontaminated by contact with the air.

It will also be apparent, that when the orange is positioned over the tube 44 by the gripping arms 131, that the orange will be momentarily held in such position until the uninflated jacket section 67 has contacted and exerted an adequate downward pressure to a point where the orange will be held against lateral movement and in proper position with respect to its aperture and the tube 44 and, at a predetermined time, the arms 131 are tripped and swung outwardly out of the path of downward movement of the mold section 65 to permit the complete cycle of operation.

It is to be understood that the form of the invention herewith shown and described is to be taken as a preferred example of the same and that various changes in the shape, size and arrangement of parts may be resorted to, without departing from the spirit of the invention or the scope of the subjoined claims.

Having thus described the invention, I claim:

1. Apparatus for extracting the juice of citrus fruit and without altering the contour of the fruit comprising first and second relatively movable confining sections, inflatable jacket sections mounted within the confining sections and adapted to receive the fruit between them when the confining sections are separated, means for shifting the confining sections together so that the jacket sections will surround the fruit, juice conducting and straining means operated in conjunction with the first-named means for movement into the interior of the fruit and extending exteriorly thereof, an inflatable bladder carried by said conducting means and shiftable therewith to the interior of the fruit, and means for inflating the jacket sections and said bladder so that the jacket sections will exert a compressive force upon the exterior of the fruit to prevent it from bursting while the bladder exerts an expanding force upon the interior contents of the fruit for compressing the contents against the rind of the fruit and causing the juice to be strained inside of the fruit and conducted by said conducting means to the outside of the fruit.

2. Apparatus for extracting the juice from citrus fruit or the like without changing the contour of the fruit, comprising first and second relatively movable mold sections, inflatable liners for the mold sections adapted to receive and hold the fruit between them, means for forming an opening in the rind of the fruit and for conveying the fruit to a position between the mold sections and liners, movable juice conducting and straining means, means for shifting the mold sections together with the liners to fruit conforming and holding positions and for substantially simultaneously moving the conducting and straining means through the opening in the rind to the interior of the fruit, inflatable means carried by the conducting and straining means and moved therewith in a deflated condition to the interior of the fruit, and means for inflating said liners and inflatable means while the mold sections are together so that the liners resist expansion or bursting of the fruit and the inflatable means forces the juice and other interior contents of the fruit outwardly and compresses the same against the rind of the fruit, whereby the juice is forced to flow through the conducting and straining means to the exterior of the fruit.

3. Apparatus for extracting juice from citrus fruit while maintaining the original contour of the fruit comprising a pair of relatively movable mold sections, inflatable jacket sections secured to the mold sections and adapted to receive the fruit between them when the mold sections are shifted together, a juice conducting and straining unit, said unit comprising tube means having a partition dividing the same into an air passage and a juice passage, the portion of the tube means forming the juice passage having perforations, an elastic inflatable bladder carried by said unit and communicating with the air passage thereof, means for introducing said unit into the interior of the fruit while the bladder is collapsed upon the unit, and means for subsequently inflating the bladder and jacket sections so that the jacket sections confine the fruit against bursting and the bladder forces the juice outwardly and causes it to flow through the perforations and into the juice passage.

4. The structure according to claim 1 wherein the exterior surface of the inflatable bladder is provided with a multiplicity of point projections to abrade and penetrate the small juice cells contained in the pulp of the fruit as the bladder is inflated.

5. The structure according to claim 1 and including means for providing an initial aperture in the fruit for the passage of the juice conducting and straining means to the interior thereof.

6. The structure according to claim 1 including means for equalizing the pressures of the jacket sections and the inflatable bladder when inflated.

References Cited in the file of this patent

UNITED STATES PATENTS

| | | |
|---|---|---|
| 825,274 | Kneuper | July 3, 1906 |
| 1,637,532 | Oliver et al. | Aug. 2, 1927 |
| 1,957,883 | Grayson | May 8, 1934 |
| 1,982,742 | Keenan | Dec. 4, 1934 |
| 1,994,114 | Somers | Mar. 12, 1935 |
| 2,329,091 | Smith | Sept. 7, 1943 |
| 2,346,561 | Delay | Apr. 11, 1944 |
| 2,414,053 | McCarthy | Jan. 7, 1947 |
| 2,420,681 | Peters | May 20, 1947 |
| 2,533,350 | Cahill | Dec. 12, 1950 |
| 2,723,618 | Matthews | Nov. 15, 1955 |
| 2,766,792 | Potter | Oct. 16, 1956 |

FOREIGN PATENTS

| | | |
|---|---|---|
| 333,276 | Italy | Dec. 24, 1935 |
| 871,216 | Germany | Mar. 19, 1953 |